Figure 1:
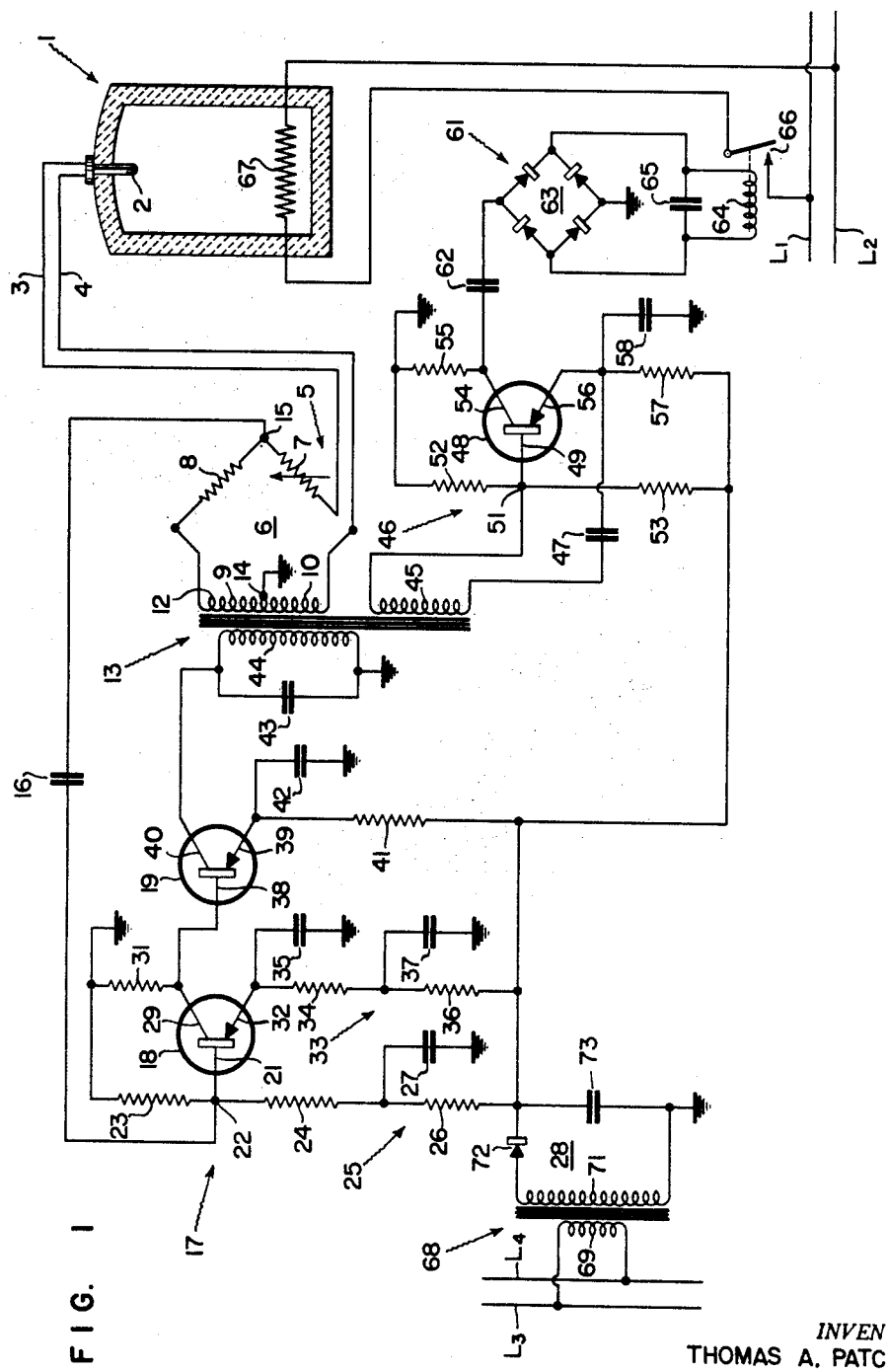

Aug. 2, 1960

T. A. PATCHELL 2,947,915

ELECTRICAL CONTROL APPARATUS

Filed Dec. 3, 1954

2 Sheets-Sheet 1

INVENTOR.
THOMAS A. PATCHELL
BY Arthur H. Swanson
ATTORNEY.

INVENTOR.
THOMAS A. PATCHELL
ATTORNEY.

United States Patent Office 2,947,915
Patented Aug. 2, 1960

2,947,915

ELECTRICAL CONTROL APPARATUS

Thomas A. Patchell, Wayne, Pa., assignor to Minneapolis-Honeywell Regulator Company, Minneapolis, Minn., a corporation of Delaware Filed Dec. 3, 1954, Ser. No. 472,825

7 Claims. (Cl. 317—146)

A general object of the present invention is to provide a new and improved electrical control apparatus. More specifically, the present invention is concerned with an oscillating type controller in which a condition sensitive impedance is employed to detect the variations in the condition being controlled.

A preferred form of variable sensing or control apparatus is one which is highly sensitive, accurate and immune to ambient conditions such as temperature, vibration, and stray electrical fields. Prior art devices have frequently been subject to inaccuracies and failures because of such ambient conditions. The protection of such prior art devices has been achieved only through a disregard of monetary and material expenditures. For example, galvanometer controllers are sensitive to vibration as well as stray electrical fields. Special mounting and shielding may be provided to increase the utility of such apparatus but this involves more protection and more labor than can be justified in many instances.

It has been found that the effects of adverse ambient conditions may be minimized in an electrical apparatus by eliminating moving electrical parts and selecting the circuitry so that it will be responsive only to desired measured variable changes. The electrical apparatus of the present invention comprises an electrical oscillator circuit wherein the oscillatory condition of the circuit is controlled by an impedance which is directly responsive to the magnitude of the variable to be measured.

Accordingly, a more specific object of the present invention is to provide a new and improved oscillating type of monitor or controller which is immune to ambient conditions.

Another specific object of the present invention is to provide a new and improved resistance controlled oscillator circuit.

Still another object of the present invention is to utilize the unbalance produced in a bridge circuit by a change in the resistance of one of its arms to control the operation of an oscillator.

Since it is frequently desirable to provide continuous monitoring or control for a plurality of conditions, still another object of the present invention is to provide a compact monitor or controller requiring little power for its operation. To this end the present invention employs transistors as its amplifying elements.

A further object of the present invention is to provide a new and improved apparatus in which a resistance bridge is employed to control the phase and attenuation of feedback from the output to the input of an amplifier.

To be acceptable, industrial control apparatus must be arranged so that upon the failure of any component the controller will operate in such a manner that it will prevent the controlled variable from going in a direction which will cause the destruction of any of the apparatus associated therewith. In addition, such a controller must be adapted to provide stable operation when subject to widely varying ambient conditions particularly that of changing temperature.

It is, therefore, a specific object of the present invention to provide an inexpensive, temperature stable, reliable control apparatus.

The various features of novelty which characterize this invention are pointed out with particularity in the claims annexed to and forming part of this specification. For a better understanding of the invention, its advantages, and the specific objects attained with its use, reference should be had to the accompanying drawings and descriptive matter in which are illustrated and described preferred embodiments of this invention.

Figure 2:
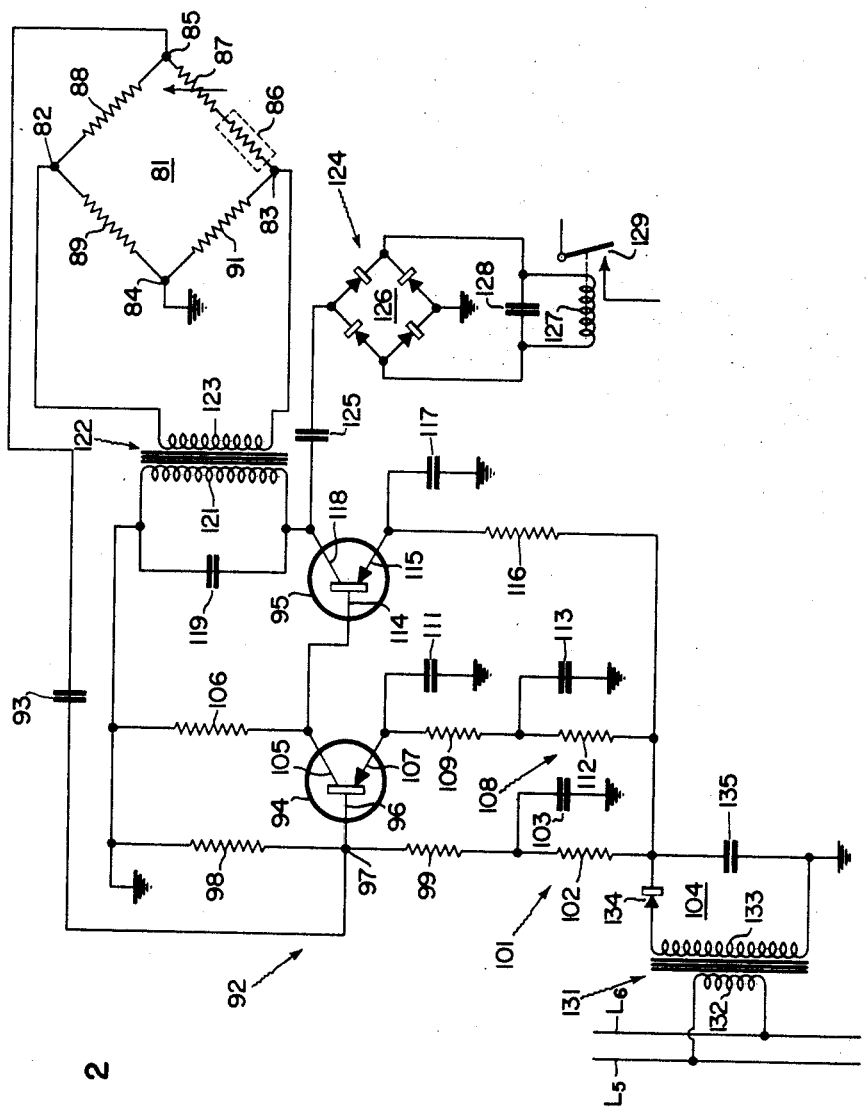

Of the drawings:

Fig. 1 is a circuit diagram of an embodiment of the present invention adapted to control the operation of a furnace; and Fig. 2 is a circuit diagram of a modification of the invention as shown in Fig. 1.

Referring now to Fig. 1, there is shown an embodiment of the present invention adapted to control the operation of the furnace 1. The temperature of the furnace 1 is sensed by means of the thermistor 2 which is connected, by means of the conductors 3 and 4, in the arm 5 of the bridge circuit 6. The bridge arm 5 includes, in addition to the temperature sensitive resistor 2, the set-point adjusting resistor 7. The other arms of the bridge circuit 6 comprise the resistor 8 and the equal sections 9 and 10 of the center-tapped secondary winding 12 of the transformer 13. As shown, the center-tap 14 of the secondary winding 12 is grounded. The output terminals of the bridge 6 are the center-tap 14 of the secondary winding 12 and the junction point 15 between the resistor 8 and the set-point adjusting resistor 7. The output of the bridge circuit 6 is coupled by means of the condenser 16 to the input of the amplifier 17.

The amplifier 17 is a two-stage direct coupled amplifier employing the transistors 18 and 19 as its amplifying elements. The transistors 18 and 19 are pnp junction type transistors having the usual collector, emitter, and base electrodes. The base 21 of transistor 18 is connected to the junction point 22 of the resistors 23 and 24. The resistors 23 and 24 are connected in series to form a voltage divider connected between ground and the filter 25. The filter 25 comprises the resistor 26 and the condenser 27 and is connected between the resistor 24 and the direct current power supply 28. The collector 29 of the transistor 18 is connected through the resistor 31 to ground. The emitter 32 of the transistor 18 is connected to the filter 33 by the resistor 34 which is by-passed to ground by means of the capacitor 35. The filter 33, comprising the resistor 36 and the capacitor 37, is connected between the resistor 34 and the power supply 28. The collector 29 of the transistor 18 is directly connected to the base 38 of the transistor 19. The emitter 39 of the transistor 19 is connected through the resistor 41, which is by-passed to ground by means of the capacitor 42, to the power supply 28. The collector 40 of the transistor 19 is connected to ground through the parallel combination of the condenser 43 and the primary winding 44 of the transformer 13. The transformer 13 has in addition to the secondary winding 12 another secondary winding 45. The secondary winding 45 is coupled to the input of a single stage amplifier 46 by means of the capacitor 47.

The amplifier 46 employs a pnp junction type transistor 48 as its amplifying element. The base 49 of the transistor 48 is connected to the junction point 51 of the resistors 52 and 53. The resistors 52 and 53 are connected in series to form a voltage divider between ground and the direct current power supply 28. The collector 54 of the transistor 48 is connected to ground through the resistor 55. The emitter 56 of the transistor 48 is connected to the power supply 28 through resistor 57 which is bypassed to ground by means of the capacitor 58. The relay circuit 61 is coupled to the collector 54 of the transistor 48 by means of the capacitor 62. This circuit includes the full wave bridge rectifier 63, the input of which is connected between the capacitor 62 and ground. The relay 64 and the capacitor 65 are connected in parallel across the output terminals of the bridge rectifier 63. The relay 64 has a pair of contacts 66 which is connected in series with the heating element 67 of the furnace 1 and a suitable source of electric power represented by the conductors $L_1$ and $L_2$. The relay 64 is thus operative to control the heating of the furnace 1.

The power supply 28 of this controller includes the transformer 68 having a primary winding 69 connected across a suitable source of alternating current, the conductors $L_3$ and $L_4$. The transformer 68 has a secondary winding 71 having one end terminal connected to ground and the other end terminal connected to the rectifier 72. The capacitor 73, connected between the rectifier 72 and ground, filters the output of the rectifier.

In the operation of the oscillating controller shown in Fig. 1, the bridge 6 is employed to control the phase and attenuation of feedback from the output to the input of the amplifier 17. The resistances of the arms of the bridge 6 are so selected that when the resistances of the thermistor 2, which decreases with an increase in furnace temperature, reaches a predetermined value, the bridge 6 ceases to provide the necessary feedback to sustain the system in oscillation. This critical value of thermistor resistance, corresponding to a specific furnace temperature, can be set by adjusting the value of the set-point resistor 7.

If the resistance of the thermistor 2 is above the value necessary to sustain oscillation, random disturbances in the amplifier 17 provide bridge output when the controlled system is energized. This output raises the potential with respect to ground of the junction point 22 in the voltage divider formed by the resistors 23 and 24. This will decrease the negative base current flowing in the transistor 18. As this negative base current decreases, the transistor collector current decreases lowering the potential with respect to ground of the collector 29 and the potential of the base 28 of the transistor 19 coupled thereto. This causes an increase in the negative base current flowing in that transistor which results in an increase in the transistor collector current. As the collector current of the transistor 19 increases, the output of the bridge 6 will increase causing a still further increase in the potential of the junction point 22. This regenerative process will cause sustained oscillation to occur at a frequency determined by the phase shift and gain characteristics of the amplifier. The maximum amplitude of these oscillations is determined by the limiting action of the transistors 18 and 19. The system thus oscillates until the value of the resistance of the thermistor 2 decreases to a point where the output of the bridge 6 will cease to supply the necessary positive feedback to the input of the amplifier 17 to sustain the oscillations.

As oscillations build up, the alternating voltage appearing across the secondary winding 45 of the transformer 13 is amplified by the single stage amplifier 46. When the value of the collector current of the transistor 48 of the amplifier 46 increases sufficiently, the relay 64 is activated. Due to the bridge rectifier 63, the relay current will be a pulsating unidirectional current. The voltage across the relay 64 is maintained constant by the capacitor 65. When the relay 64 is activated, the contacts 66 are closed energizing the heating element 67 of the furnace 1. As the temperature within the furnace 1 increases, the resistance of the thermistor 2 will decrease. When this resistance reaches the critical value, the controller will stop oscillating and the relay 64 will be de-energized, disconnecting the furnace heating element 67 from the conductors $L_1$ and $L_2$.

Several features of the circuit configuration employed in the controller shown in Fig. 1 serve to make it a highly temperature stable apparatus. The resistor 34 in series with the emitter 32 of the transistor 18 provides, in cooperation with the voltage divider formed by the resistors 23 and 24, a means for obtaining transistor bias with a minimum dependence on the temperature sensitive collector saturation current ($Ico$) of the transistor. The resistor 41 in series with the emitter 39 of the transistor 19 serves a similar purpose. In addition, the energization of the bridge circuit 6 with only the alternating component of the collector current of the transistor 48 tends to make the bridge output relatively independent of changes in that transistor's D.C. operating point.

To be acceptable, any controller must be arranged so that upon failure of any component, the control apparatus will operate in such a manner as to prevent the controlled variable from going in a direction which will cause the destruction of any of the apparatus associated therewith. With regard to the safe failing features of the apparatus shown in Fig. 1, it should be noted that any failure causing the loss of the oscillating control signal to the input of the relay circuit 61 will render the relay 64 inoperative to hold the contacts 66 in engagement. For example, the short circuiting of any of the transistor elements would cause the loss of the A.C. signal to the relay circuit 61 and the controller would consequently fail safe. Similarly, any open circuit condition causing the loss in A.C. signals to the relay circuit 61 will prevent the energization of the relay 64, assuring safe failure.

The frequency of oscillation of this system depends primarily upon the value of the capacitor 43 and the inductances of the transformer 13 and to a lesser extent upon the values of certain other circuit components. By way of illustration and example, and not by way of limitation, the following list of components is typical for the embodiment of the invention shown in Fig. 1 and provide a highly effective and practical controller which oscillates about 1000 c.p.s.

Resistors:
| | |
|---|---|
| 7 | 0–10,000 ohms. |
| 8 | 3,000 ohms. |
| 41 | 100,000 ohms. |
| 55 | 5,000 ohms. |
| 23, 52 and 53 | 20,000 ohms. |
| 24, 26, 34, and 36 | 50,000 ohms. |
| 31 and 57 | 10,000 ohms. |

Capacitors:
| | |
|---|---|
| 43 | 0.2 mfd. |
| 73 | 5.0 mfds. |
| 16, 35, 42, 47, 58, 62, and 65 | 1.0 mfd. |
| 27 and 37 | 10 mfds. |

Transformers:
| | |
|---|---|
| 13 | Primary inductance 116 mh., turn ratio 5:2. |
| 68 | 115 v. to 70 v. |

Transistors 18, 19, and 48 — 2N34.

Rectifier bridges:
| | |
|---|---|
| 64 | (4) 1N34. |
| 72 | 11 ma., 115 v. peak inverse voltage. |

Relay 64 — Sigma, series 5, 5000 ohm coil.

Referring now to Fig. 2, there is shown a modification of the embodiment of the present invention shown in Fig. 1. The numeral 81 represents a Wheatstone bridge circuit having the input terminals 82 and 83 and the output terminals 84 and 85. One arm of the bridge circuit 81 includes the negative temperature coefficient resistor 86 and the set point adjusting resistor 87. The remaining three arms of the bridge comprise the resistors 88, 89, and 91 respectively. The output terminal 84 of the bridge 81 is connected to ground. The other output terminal 85 of the bridge 81 is connected to the input of the amplifier 92 by means of the coupling capacitor 93.

The amplifier 93 is a two stage direct coupled amplifier employing the transistors 94 and 95 as its amplifying elements. The transistors 94 and 95 are pnp junction type transistors having the usual collector, emitter, and base electrodes. The base 96 of the transistor 94 is connected to the junction point 97 of the resistors 98 and 99. The resistors 98 and 99 are connected in series to form a voltage divider between ground and the power supply filter 101. The filter 101 comprising the resistor 102 and the capacitor 103 is connected in series between the resistor 99 and the direct current power supply 104. The collector 105 of the transistor 94 is connected to ground through the resistor 106. The emitter 107 of the transistor 94 is connected to the power supply filter 108 through the resistor 109 which is bypassed to ground by the capacitor 111. The filter 108 which comprises the resistor 112 and the capacitor 113 is connected between the resistor 109 and the power supply 104. The collector 106 of the transistor 94 is also directly coupled to the base 114 of the transistor 95. The emitter 115 of the transistor 95 is connected to the power supply 104 through the resistor 116 which is bypassed to ground by means of the capacitor 117. The collector 118 of the transistor 95 is connected to ground through the parallel combination of the capacitor 119 and the primary winding 121 of the transformer 122. The transformer 122 has a secondary winding 123 connected across the input terminals 82 and 83 of the bridge 81.

The relay circuit 124 is coupled to the collector 118 of the transistor 95 by means of the capacitor 125. This circuit includes the full wave bridge rectifier 126 the input of which is connected between the capacitor 125 and ground. The relay 127 and the capacitor 128 are connected in parallel across the output terminals of the bridge rectifier 126. The relay 127 has a pair of contacts 129 which may be employed to perform a suitable control operation.

The power supply for the controller shown in Fig. 2 includes the transformer 131 having a primary winding 132 connected across the suitable source of alternating current, the conductors L₅ and L₆. The secondary winding 133 of the transformer 131 has one end terminal connected to ground and the other end terminal connected to the rectifier 134. The capacitor 135 connected between ground and the rectifier 134 acts as a smoothing filter for the output of the rectifier.

The controller shown in Fig. 2 is a modification of the controller shown in Fig. 1. The relay circuit 124 is energized directly from the output of the two stage amplifier 92 thereby eliminating one stage of amplification and permitting the use of a standard interstage transformer with a single secondary winding. Again, the bridge circuit controls the phase and attenuation of feedback from the output to the input of the amplifier. The resistances of the arms of the bridge 81 are so selected, that when the resistance of the thermistor 86 reaches a predetermined value, the bridge 81 ceases to provide the necessary positive feedback to sustain the system in oscillation. This critical value can be adjusted by adjusting the set point resistor 87.

Sustained oscillations occur in the operation of this controller at a frequency determined by the phase shift and gain characteristics of the amplifier in the manner described in the discussion of Fig. 1. The maximum amplitude of these oscillations is determined by the limiting action of the transistors 94 and 95. The system oscillates until the value of the resistance of the thermistor 86 decreases to a point where the output of the bridge 81 ceases to supply the necessary positive feedback to the input of the amplifier 92 to sustain this system in oscillation.

As oscillations build up, the alternating current flowing in the collector circuit of the transistor 95 is applied across the input terminals of the bridge rectifier 126 of the relay circuit 124 by means of the coupling capacitor 125. When this current increases sufficiently, the relay 127 is activated. Due to the bridge rectifier 126, the relay current will be a pulsating unidirectional current. The capacitor 128 prevents the relay from chattering when so energized. When the relay 127 is energized, the contacts 129 are closed and can thus be utilized to perform a suitable control operation.

From the foregoing it will be apparent that the relay 127 will be energized only when there is an alternating component of the collector current of the transistor 95. The importance of this is readily apparent since changes in transistor collector current due solely to the changes in ambient temperature will be ineffective to cause relay operation. This, in addition to the circuit configuration employed in the amplifier 92 which is similar to that employed in the amplifier 17 of Fig. 1, combine to make the controller of Fig. 2 a temperature stable device.

With regard to the safe failing features of this apparatus, it should be noted that any failure causing the loss of the oscillating control signal will render the circuit ineffective to cause relay operation. For example, the short circuiting of the elements of the transistors 94 and 95 will cause the loss of the A.C. signal, and this system will fail safe. Similarly, any open circuit condition causing the loss of the A.C. control signal will prevent the relay 127 from being energized and consequently safe failure.

The frequency of oscillation of this system depends primarily upon the value of the capacitor 119 and the various inductances of the interstage transformer 122 and to a lesser extent upon the values of certain other circuit components. By way of illustration, the following list of components is typical for the embodiment of this invention shown in Fig. 2 and provides a highly effective and practical controller which will oscillate at about 500 c.p.s.

Resistors:
 87 _____ 0–10,000 ohms.
 98 _____ 40,000 ohms.
 99 _____ 22,000 ohms.
 102 _____ 29,000 ohms.
 116 _____ 20,000 ohms.
 88, 89, and 91 _____ 5,000 ohms.
 106, 109, and 112 _____ 10,000 ohms.
Capacitors:
 119 _____ .01 mfd.
 135 _____ 5.0 mfds.
 93, 111, 117, 125, and 128 ___ 1.0 mfd.
 103 and 113 _____ 10 mfds.
Transformers:
 122 _____ Turns ratio 7:1.
 131 _____ 115 v. to 70 v.
Rectifier bridges:
 126 _____ (4) 1N34.
 134 _____ 11 ma. 115 v. peak inverse voltage.
Relay 127 _____ Sigma, Series 5, 5,000 ohm coil.
Transistors 94 and 95 _____ 2N34.

As shown, the transistors employed in the controllers of Fig. 1 and Fig. 2 are pnp junction type transistors but it should be understood that they could also be npn junction type transistors with suitable changes in the values of various circuit components and parameters. If, for a particular application, it would be desirable to have the controller break into oscillation when the temperature sensing thermistor reaches its critical value, this could be accomplished by reversing the connections to the bridge output.

While, in accordance with the provisions of the statutes, there has been illustrated and described the best form of the embodiments of the invention known, it will be apparent to those skilled in the art that changes may be made in the form of the apparatus disclosed without departing from the spirit of the invention as set forth in the appended claims and that in some instances certain features of the invention may be used to advantage without corresponding use of other features.

Having now described my invention what I claim as new and desire to secure by Letters Patent is as follows:

1. In apparatus for controlling the value of a condition, the combination comprising an electrical bridge network having an input and an output and operative to produce in said output an output signal of a phase, with respect to an energizing signal applied to said input, which is controlled by the value of said condition, an amplifier having an input and an output, first circuit means connecting the output of said amplifier in an energizing relationship to the input of said network, second circuit means connecting the output of said network in an energizing relationship to the input of said amplifier, said circuit means connecting said network in a feedback path between said output and said input of said amplifier to cause an output signal produced in said amplifier output to be fed back regeneratively to said amplifier input through said network, and hence to cause the apparatus to oscillate, when said network output signal has a phase corresponding to a predetermined range of the values of said condition, said phase of said network output signal thereby determining the presence and absence of oscillations in the apparatus in accordance with the value of said condition, and control means connected to the output of said amplifier and operative in one sense in response to the presence of oscillations and in the opposite sense in the absence of oscillations, said control means comprising a relay having contacts arranged to control the value of said condition and having an operating winding arranged to close said contacts solely when said winding is operatively energized, rectifier means having an input and an output, a connection including a D.C. blocking device connected between said rectifier input and said amplifier output to apply said oscillations to said rectifier input, said rectifier operating to rectify said oscillations and to produce solely therefrom a D.C. output signal in its said output, and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

2. In apparatus for controlling the value of a condition, the combination comprising a bridge circuit having for one of its arms an electrical element having a characteristic which is dependent upon the condition to be controlled, said bridge circuit having an input and an output, an amplifier having an input and an output, first circuit means connecting the output of said amplifier in an energizing relationship to the input of said bridge circuit, second circuit means connecting the output of said bridge circuit in an energizing relationship to the input of said amplifier, the phase of said bridge output with respect to said amplifier input being such as to cause said apparatus to oscillate when said characteristic differs in a predetermined direction from a predetermined value and not to cause said apparatus to oscillate when said characteristic differs in the opposite direction from said predetermined value, said apparatus producing oscillations when caused to oscillate, and control means connected to the output of said amplifier responsive to the presence or absence of said oscillations, said control means comprising a relay having contacts arranged to control the value of said condition and having an operating winding arranged to close said contacts solely when said winding is operatively energized, rectifier means having an input and an output, a connection including a D.C. blocking device connected between said rectifier input and said amplifier output to apply said oscillations to said rectifier input, said rectifier operating to rectify said oscillations and to produce solely therefrom a D.C. output signal in its said output, and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

3. Apparatus as specified in claim 2 wherein said electrical element is a resistor the resistance of which is dependent upon the condition to be controlled.

4. An oscillating electric controller comprising in combination a bridge circuit having for one of its arms a resistor the resistance of which is dependent upon the condition to be controlled, a transistor amplifier having an input and an output, circuit means connecting said bridge circuit to the input of said amplifier, control means connected to the output of said amplifier, and operative in one sense in response to the presence of oscillations and in the opposite sense in the absence of oscillations, and means connected to said amplifier output for energizing said bridge circuit to cause said bridge to provide feedback to said amplifier input, the phase of said feedback and hense system oscillation being dependent upon the resistance of said resistor, said control means comprising a relay having contacts arranged to control the value of said condition and having an operating winding arranged to close said contacts solely when said winding is operatively energized, rectifier means having an input and an output, a connection including a D.C. blocking device connected between said rectifier input and said amplifier output to apply said oscillations to said rectifier input, said rectifier operating to rectify said oscillations and to produce solely therefrom a D.C. output signal in its said output, and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

5. An oscillating electronic controller comprising in combination, a first amplifier having an input and an output, a bridge circuit having for one of its arms an electrical element having a characteristic which is dependent upon the condition to be controlled, said bridge circuit having an input and an output, first circuit means coupling the output of said first amplifier to the input of said bridge circuit, second circuit means coupling the output of said bridge circuit to the input of said first amplifier to cause said controller to produce and not to produce oscillations, respectively, as said condition has a value above and below a predetermined value, a second amplifier having an input and an output, said first circuit means coupling the input of said second amplifier to the output of said first amplifier, and circuit control means coupled to the output of said second amplifier, said control means comprising a relay having contacts arranged to control the value of said condition and having an operating winding arranged to close said contacts solely when said winding is operatively energized, rectifier means having an input and an output, a connection including a D.C. blocking device connected between said rectifier input and said second amplifier output to apply said oscillations to said rectifier input, said rectifier operating to rectify said oscillations and to produce solely therefrom a D.C. output signal in its said output and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

6. An oscillating electronic controller comprising in combination a two stage transistor amplifier, each of said stages employing the transistor connected in a grounded emitter configuration as its amplifying element, each of said transistors having an emitter, a collector, and a base electrode, said stages being direct coupled, a bridge circuit, said bridge circuit having connected therein an element having a characteristic which varies with the condition being controlled, a transformer coupling said bridge circuit to the collector circuit of the transistor in the second of said amplifying stages, circuit means connecting said bridge circuit to the base circuit of the transistor in said first amplifying stage, the phase of said bridge output determining the presence or absence of oscillations in said controller, and control means connected to the collector of the transistor in said last amplifying stage and responsive to the presence of oscillations in said controller, said control means comprising a relay having contacts arranged to control the value of said condition and having an operating winding arranged to close said contacts solely when said winding is operatively energized, rectifier means having an input and an output, a connection including a D.C. blocking device connected between said rectifier input and the last mentioned collector to apply said oscillations to said rectifier input, said rectifier operating to rectify said oscillations and to produce solely therefrom a D.C. output signal in its said output, and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

7. In combination, a multi-stage direct coupled transistor amplifier having an input and an output, a feedback path connecting the output of said amplifier to the input of said amplifier, a Wheatstone bridge circuit connected in said feedback path, a negative temperature coefficient resistor arranged to be responsive to the value of a condition and connected in one of the arms of said bridge circuit, said bridge circuit controlling the phase and amplitude of the feedback from the output to the input of said amplifier in accordance with the resistance of said negative temperature coefficient resistor and hence causing said combination to oscillate when the resistance of said resistor is above a predetermined value and not to oscillate when the resistance of said resistor is below a predetermined value, said combination producing oscillations when caused to oscillate, and control means coupled to the output of said transistor amplifier and energized by said oscillations, said control means comprising a relay having contacts arranged to control the value of said condition and having an operating winding arranged to close said contacts solely when said winding is operatively energized, rectifier means having an input and an output, a connection including a D.C. blocking device connected between said rectifier input and said amplifier output to apply said oscillations to said rectifier input, said rectifier operating to rectify said oscillations and to produce solely therefrom a D.C. output signal in its said output, and a connection between said rectifier output and said winding over which said winding is operatively energized solely by said D.C. output signal and hence solely by said rectified oscillations, the latter constituting the sole energization for said winding, whereby said contacts are caused to be closed solely in the presence of said oscillations and to be open in the absence of said oscillations.

References Cited in the file of this patent

UNITED STATES PATENTS

| | | |
|---|---|---|
| 2,093,745 | Westell | Sept. 21, 1937 |
| 2,275,452 | Meacham | Mar. 10, 1942 |
| 2,278,633 | Bangall | Apr. 7, 1942 |
| 2,451,858 | Mork | Oct. 19, 1948 |
| 2,550,527 | Capuzzi | Apr. 24, 1951 |
| 2,553,060 | Miner | May 15, 1951 |
| 2,773,220 | Aron | Dec. 4, 1956 |
| 2,794,105 | Brandenberger | May 28, 1957 |

OTHER REFERENCES

"Circuit Applications," pages 171–173 of Electronics, for August 1953.

"Low Distortion Transistor Audio Oscillator," by Sulzer, pages 171–173 of Electronics, for September 1953.

"Complementary Symmetry Transistor Circuits," by Lohman, pages 140–143 of Electronics, for September 1953.

"Transistors vs. Tubes," by Shea, pages 771–772 of Instruments and Automation, for May 1954.